(12) United States Patent  (10) Patent No.: US 7,719,540 B2
Piazza et al.  (45) Date of Patent: May 18, 2010

(54) RENDER-CACHE CONTROLLER FOR MULTITHREADING, MULTI-CORE GRAPHICS PROCESSOR

(75) Inventors: Thomas A. Piazza, Granite Bay, CA (US); Prasoonkumar Surti, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1589 days.

(21) Appl. No.: 10/816,052

(22) Filed: Mar. 31, 2004

(65) Prior Publication Data

US 2005/0219253 A1    Oct. 6, 2005

(51) Int. Cl.
  *G09G 5/36*   (2006.01)
  *G06F 15/00*  (2006.01)
  *G06T 1/00*   (2006.01)
(52) U.S. Cl. ........................ 345/557; 345/501
(58) Field of Classification Search ................ 345/557; 712/219; 709/106
See application file for complete search history.

(56) References Cited

U.S. PATENT DOCUMENTS

| 5,959,639 | A | 9/1999 | Wada | |
| 6,072,505 | A | 6/2000 | Piazza et al. | |
| 6,091,428 | A | 7/2000 | Piazza et al. | |
| 6,130,680 | A | 10/2000 | Cox et al. | |
| 6,496,193 | B1 | 12/2002 | Surti et al. | |
| 6,538,650 | B1 | 3/2003 | Prasoonkumar et al. | |
| 6,549,930 | B1* | 4/2003 | Chrysos et al. | 718/104 |
| 6,633,299 | B1 | 10/2003 | Sreenivas et al. | |
| 6,785,803 | B1* | 8/2004 | Merchant et al. | 712/219 |
| 7,039,914 | B2* | 5/2006 | Potter, Jr. | 718/102 |
| 2002/0078124 | A1* | 6/2002 | Baylor et al. | 709/106 |
| 2003/0046488 | A1* | 3/2003 | Rosenbluth et al. | 711/108 |
| 2003/0164823 | A1 | 9/2003 | Baldwin et al. | |
| 2004/0233208 | A1* | 11/2004 | Hussain | 345/557 |
| 2005/0122339 | A1* | 6/2005 | Andrews et al. | 345/557 |

* cited by examiner

*Primary Examiner*—Kee M Tung
*Assistant Examiner*—Jacinta Crawford
(74) *Attorney, Agent, or Firm*—Blakely, Sokoloff, Taylor & Zafman LLP

(57) ABSTRACT

A method and apparatus for rendering three-dimensional graphics using a streaming render-cache with a multi-threading, multi-core graphics processor are disclosed. The graphics processor includes a streaming render-cache and render-cache controller to maintain the order in which threads are dispatched to the graphics engine, and to maintain data coherency between the render-cache and the main memory. The render-cache controller blocks threads from being dispatched to the graphics engine out of order by only allowing one sub-span to be in-flight at any given time.

23 Claims, 4 Drawing Sheets

RENDER-CACHE CONTROLLER 22

CACHE-LINE STATUS ARRAY
40

PIXEL MASK ARRAY
42

TAG CONTENT ADDRESSABLE MEMORY (CAM)
44

FIG. 3

RENDER-CACHE CONTROLLER FOR MULTITHREADING, MULTI-CORE GRAPHICS PROCESSOR

FIELD

An embodiment of the present invention relates generally to computer graphics architecture, and more particularly, to a method and apparatus for rendering graphics. Other embodiments are also described.

BACKGROUND

In the field of computer graphics, rendering refers to the process of adding realism to computer graphics by adding three-dimensional (3D) qualities, such as shadowing, color variation, and shade, to objects displayed on a two-dimensional display. Modern 3D graphics processors are commonly used to render 3D graphical images for display. Rendering is typically accomplished by breaking the objects up into a series of primitives such as polygons, typically, triangles. For each pixel that makes up the polygon, attribute values are assigned for attributes such as color, specular color, alpha (transparency), fog, surface texture, and depth. The attribute values are then combined, or otherwise processed, by the graphics processor to achieve a precise pixel value for each pixel that makes up the object. To render a realistic image, often several processing operations, involving a variety of attributes, must be performed for each individual pixel that makes up the object or image.

A graphics processor is generally limited by the clock speed with which it can process the individual pixels of a 3D computer image. One way in which system designers have improved the efficiency of graphics processors is by designing processors to perform multiple pixel processing operations at the same time. For example, to increase the overall efficiency of graphics processors, system designers have developed multithreading, multi-core graphics processors. As the name suggests, a multithreading, multi-core graphics processor has multiple cores, or pixel processing units, that operate on pixels in parallel. Each core of the engine is directed to process pixels by a stream of instructions referred to as a thread. One of the advantages of a multithreading, multi-core approach to pixel processing is that the graphics processor can switch between threads if, for example, one thread is required to wait for pixel data to be fetched from main memory.

To further improve efficiency, many graphics processors have been designed with an on-chip cache to store pixel data that is being processed. In particular, if the on-chip cache contains the pixel data that is required for processing, the processing occurs more quickly because the graphics processor need not wait for the pixel data to be fetched from main memory every time it is required for a pixel processing operation. The reduced number of main memory accesses improves the overall efficiency of the graphics processor.

However, implementing a caching technique with a multithreading, multi-core graphics processor poses several challenges. Due to thread-switching in a multithreading, multi-core graphics engine, the order in which pixel processing operations are completed may be different than the order in which the threads are dispatched to the multi-core engine. For example, if two threads are dispatched to the multi-core engine to perform processing on the same pixel (e.g., each thread specifies the same x,y coordinates, representing the same pixel), due to thread-switching, the pixel processing operations are not guaranteed to be performed in the order in which the threads are dispatched to the multi-core engine. Consequently, if the pixel processing operations are performed out of order, the resulting pixel data may be incorrect.

Another problem is maintaining pixel data coherency for the cache and main memory. For example, after a pixel processing operation is performed and the resulting pixel value is written to the cache, the value for that particular pixel, as stored in the cache, will be different than the corresponding value stored in main memory. Consequently, a main memory read operation results in an improper pixel value being read.

One solution to these problems is to implement two separate cache controllers, for example, one cache controller in the graphics engine to maintain data coherency between the render-cache and main memory, and a separate controller to maintain the order in which threads are dispatched to the core. However, a problem with this prior art solution is the overall size of the logic required for implementing the solutions. For example, because each cache-controller has its own content addressable memory, the overall size of the logic (e.g., number of gates required to implement the solution) is larger than desired.

BRIEF DESCRIPTION OF THE DRAWINGS

Reference in the specification to "an embodiment" or "one embodiment" means that a particular feature, structure, or characteristic described in connection with the embodiment is included in at least one embodiment of the invention. The appearance of the phrase "for one embodiment" or "in one embodiment" in various places in the specification does not necessarily refer to the same embodiment, nor are separate or alternative embodiments mutually exclusive of other embodiments. Embodiments of the present invention are illustrated by way of example, and not by way of limitation, in the figures of the accompanying drawings, in which like references indicate similar elements, and in which:

FIG. 3 is a block diagram illustrating a render-cache controller for one embodiment of the present invention.

DETAILED DESCRIPTION

An embodiment of the invention is directed to a method and apparatus for rendering three-dimensional (3D) graphics using a streaming render-cache with a multi-threaded, multi-core graphics processor. In the following description, for purposes of explanation, numerous specific details are set forth in order to provide a thorough understanding of the present invention. It will be evident, however, to one skilled in the art that the present invention may be practiced without these specific details.

Figure 1:
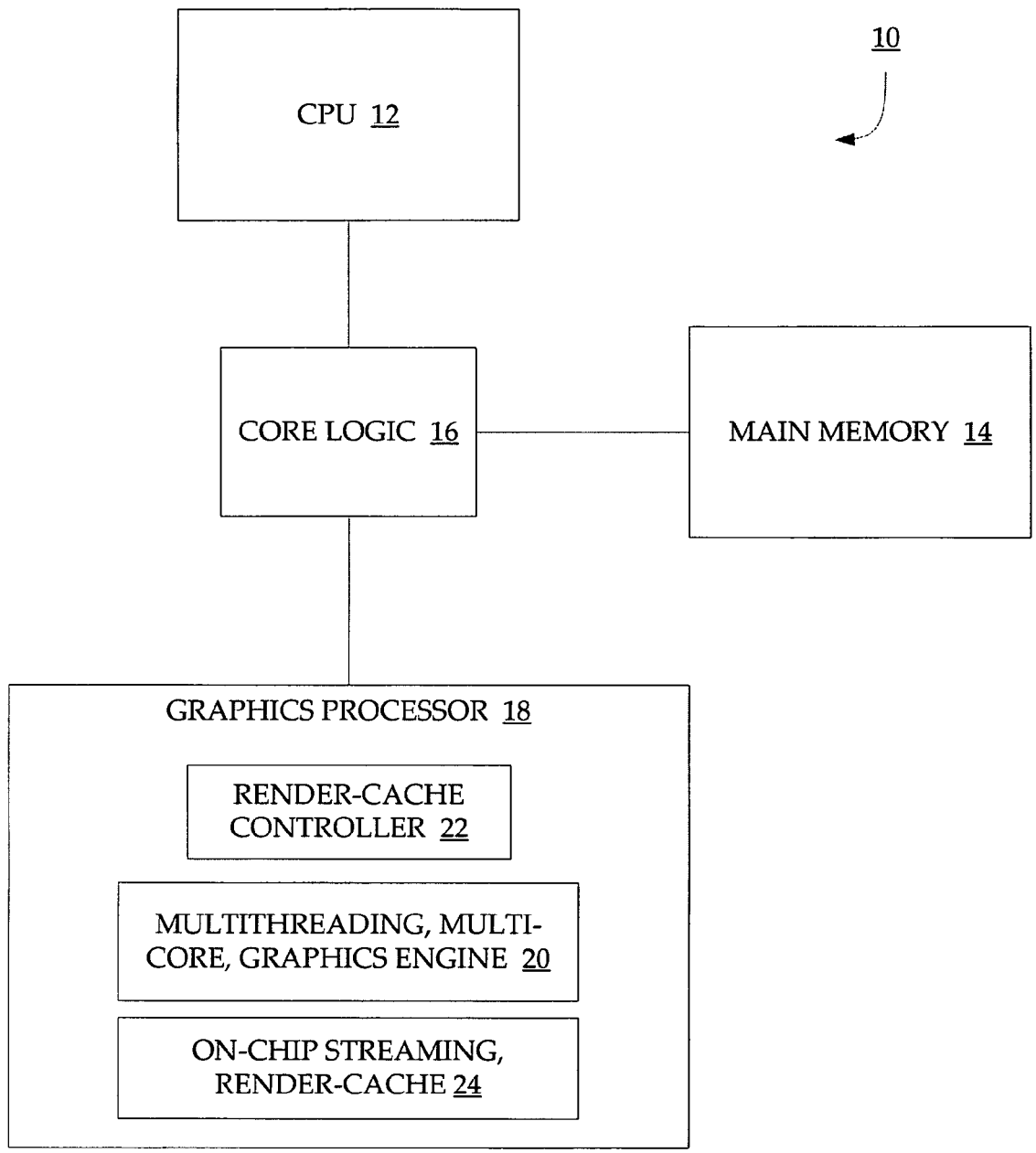
FIG. 1 is a block diagram illustrating a computer graphics system including a multithreading, multi-core graphics processor.

Referring to FIG. 1, a block diagram of a computer graphics system 10 including a multithreading, multi-core graphics processor 18 for rendering 3D graphical images is illustrated. The computer graphics system 10 includes a central processing unit (CPU) 12 connected with a main memory 14 via core logic 16, as well as a graphics processor 18. The graphics processor 18 includes a multithreading, multi-core graphics engine 20, a render-cache controller 22, and an associated streaming render-cache 24. The core logic 14, sometimes referred to as a bridge or bridge logic, controls the exchange of data between the main memory 14, the CPU 12 and the graphics processor 18, in addition to handling input and output functions for the system. Generally, the graphics processor 18 determines the graphic information to be sent to a display, based on instructions and data received from the CPU 12 and the main memory 14.

For one embodiment of the present invention, the CPU 12 executes a series of instructions directing the graphics processor 18 to generate one or more images for display. Accordingly, the CPU 12 communicates instructions to the graphics processor 18 identifying the location in the main memory 14 of the data from which to generate the graphic image or images. The data may include geometric shapes defined by a fixed set of vertices, each vertex being assigned attribute values for a variety of attributes. For example, the attributes may include, but are not limited to: color, specular color, alpha (transparency), fog, surface texture, and depth. Based on the attribute values of each vertex, the graphics processor 18 traverses the pixels of the polygon and assigns attribute values for corresponding attributes to each pixel comprising the polygon to be rendered. Theses attribute values, generically referred to herein as pixel data, are the operands, or inputs, for pixel processing operations. The multithreading, multi-core graphics engine may be capable of a wide variety of pixel processing operations.

Figure 2:
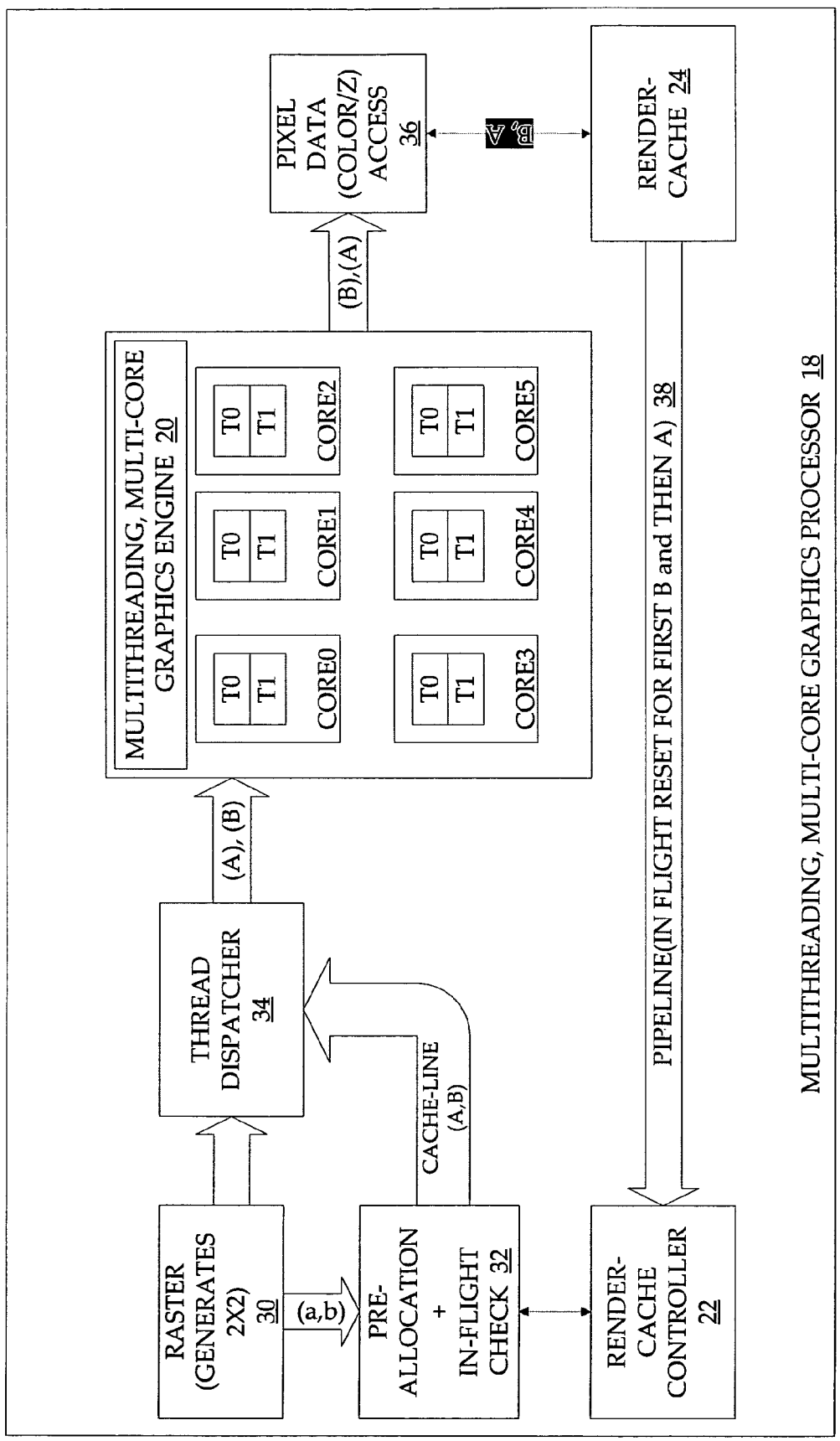
FIG. 2 is a combination block/data flow diagram illustrating, for one embodiment of the present invention, the flow of pixel data through a multithreading, multi-core graphics engine.

FIG. 2 is a combination block/data flow diagram illustrating, for one embodiment of the present invention, the flow of pixel data through a multithreading, multi-core graphics engine 20. The graphics processor 18 illustrated in FIG. 2 includes raster logic 30 that generates threads (e.g., a sequence of pixel processing instructions) that are dispatched by a thread dispatcher 34 to the multithreading, multi-core graphics engine 20. The graphics engine 20 includes multiple cores, and each core may operate in parallel and may be capable of thread-switching. While the graphics engine 20 shown in FIG. 2 includes six cores, it will be appreciated that in practice the actual number of cores may vary.

Each core within the multi-core graphics engine 20 performs pixel processing operations on pixel data based on instructions received via threads from the thread dispatcher 34. Each thread identifies the location of the pixel data to be processed, by indicating one or more cache-line addresses of the render-cache 24 where pixel data is stored. Each time a thread becomes active within a core, the graphics engine 20 performs a pixel data access operation 36 to fetch pixel data from the render-cache 24. Furthermore, each core of the graphics engine 20 is capable of thread-switching. For example, in FIG. 2, the references "T0" and "T1" within each core represent different threads. While each core can only process one thread at any given moment in time, each core has the ability to switch amongst the threads if, for example, the pixel data required for a pixel processing operation associated with a particular thread is not yet stored in the render-cache 24. In such a case, a core may switch from one thread to another, for example, from thread T0 to thread T1.

Once the graphics engine 20 has completed a pixel processing operation, it may write the processed pixel data to the same location in the render-cache 24 from which it was originally read. Consequently, as new threads are dispatched, if a cache hit occurs, the processed pixel data may be used in a subsequent pixel processing operation without having to be fetched from main memory 14 or some other slower graphics memory (not shown). However, if the processed pixel data is not required in a subsequent pixel processing operation, it may eventually be written to main memory, or a graphics memory (not shown) so that it can be output to a display if necessary.

As briefly described above, the graphics processor 18 includes raster logic 30. For one embodiment of the present invention, the raster logic 30 analyzes data representing an object to be rendered by traversing, or walking, a primitive and generating pixel data (e.g., attribute values) for each pixel that is part of the primitive.

As the raster logic 30 traverses the primitive, it generates threads, which when executed within the multithreading, multi-core graphics engine 18, cause the individual cores to perform pixel processing operations (e.g., pixel shading operations) using sub-spans that are, for example, 2 pixels by 2 pixels. However, before each thread is dispatched to the multi-core engine 20, the raster logic 30 performs a pre-allocation and in-flight check routine 32 to allow the pixel data for each pixel of the sub-span to be in the render-cache 24 and readily accessible to the multi-core engine 20 when the thread is received by the multi-core engine 20. By pre-allocating the pixel data to the render-cache, the latency of the main memory 14 access is hidden from the multi-core graphics engine 20.

The routine 32 may involve two basic operations. First, the render-cache controller 22 is checked to determine whether the pixel data for each pixel in the sub-span has been previously allocated to the render-cache 24. If the render-cache controller 22 indicates that the pixel data, corresponding to a particular pixel to be processed in connection with the thread, has not been previously allocated (e.g., a cache miss), then the pixel data corresponding to that particular pixel is allocated to the render-cache 24. However, if the render-cache controller 22 indicates that the pixel data, corresponding to a particular pixel to be processed by the thread, has already been allocated to the render-cache 24 (e.g., a cache hit), then the render-cache controller 22 determines the state of the previously allocated pixel data.

In particular, the render-cache controller 22 determines: (1) whether the previously allocated pixel data is waiting to be processed by the graphics engine (e.g., not yet read by the graphics engine), (2) whether the previously allocated pixel data has been read by the graphics engine, but the result of the pixel processing operation not yet written back to the render-cache 24, or alternatively, (3) whether the previously allocated pixel data has already been read, processed by the graphics engine 20 and written back to the render-cache 24. For example, the possibility exists that the pixel data in the render-cache 24 was allocated in connection with a previously dispatched thread that has yet to be processed by the graphics engine 20. This situation is referred to as a pixel "in-flight", or not yet "retired" from the core. For example, a pixel is said to be "in-flight" when it is in a transitive state, meaning that it has been read from the render-cache 24 by the graphics engine 20, but not yet processed and written back to the render-cache 24. For one embodiment of the present invention, the render-cache controller 22 prevents a thread from being dispatched if any pixel data corresponding to pixels in the sub-span being processed by the particular thread are in-flight. This ensures that pixels are processed in the proper order, particularly when multiple threads require access to pixel data associated with pixels having the same X and Y coordinates and the result is dependent on the order of processing.

FIG. 3 is a block diagram illustrating a render-cache controller 22 for one embodiment of the present invention. The render-cache controller 22 includes a cache-line status array 40, a pixel mask array 42, and a content addressable memory (CAM) 44. Together, these three components maintain the data coherency of the render-cache and ensure that threads are dispatched to the graphics engine 20 in the proper order.

The CAM 44 maps X and Y pixel coordinates to corresponding cache-line addresses in the render-cache 24. For example, the CAM 44 receives as input data representing the pixel coordinates of a pixel. If the CAM 44 has a matching entry, the CAM 44 outputs an address representing the location in the render-cache where the pixel data associated with the pixel coordinates is stored. For one embodiment of the invention, the CAM 44 is as wide as 30 bits and has a depth of 128 entries. In order to operate at a high frequency, the look-up function, or comparator function, of the CAM 44 can be done in parallel and can be finalized over more than one clock cycle in a pipelined manner. For one embodiment of the present invention, the CAM 44 is fully associative, meaning that any main memory address has the full freedom to be replicated at any address in the render-cache 24.

The pixel mask array 42 indicates whether pixel data associated with a particular pixel stored in the render-cache 24 is in-flight. For example, before dispatching a thread to perform a pixel processing operation on a particular pixel stored in the render-cache 24, the pixel mask array 42 is checked to determine whether the particular pixel in render-cache 24 is waiting to be processed by the graphics engine 20 in connection with a previously dispatched thread. For one embodiment of the present invention, the pixel mask array 42 has the same depth, or number of entries, as the CAM 44. Furthermore, for one embodiment of the invention, each entry comprises a single bit corresponding to a cache-line in the render-cache 24. Whether the bit is set or not determines whether the pixel data stored in the corresponding cache-line is in-flight. For example, for one embodiment of the invention, a bit in the pixel mask array 42 that is set indicates that the pixel data stored in the cache-line associated with the bit in the pixel mask array 42 is in-flight. Consequently, any thread instructing the graphics engine 20 to perform a pixel processing operation on pixel data stored in that particular cache-line of the render-cache 24 will be blocked from being dispatched until the graphics engine 20 has completed processing the pixel data and written the processed pixel data back to the cache-line of the render-cache 24.

For one embodiment of the present invention, the pixel mask array 42 is updated, or reset, when the graphics engine 20 writes the resulting processed pixel data to the render-cache 24. For example, for one embodiment of the invention, when the graphics engine 20 accesses the render-cache 24 during a write operation, the cache-line address that is being written to is communicated to the render-cache controller 22 via a pipeline 38. Consequently, the render-cache controller 22 determines that the cache-line contains processed pixel data and accordingly, the bit in the pixel mask array 42 corresponding to the cache-line address is cleared, or reset. Similarly, when the graphics engine 20 reads a particular cache-line, the address of the cache-line is pipelined to the render-cache controller 22 and the bit in the pixel mask array 42 corresponding to the cache-line is set, indicating that the pixel data associated with the cache-line address is in-flight.

For one embodiment of the present invention, the cache-line status array 40 is a single bit array of the same size of the CAM 44. Like the pixel mask array 42, each bit in the cache-line status array 40 corresponds with a cache-line in the render-cache 24 and indicates whether the graphics engine 20 has accessed the pixel data stored at the address of the cache-line. A bit in the cache-line status array 40 is set when pixel data at the cache-line address corresponding to the bit is in-flight, and reset when not in-flight. The cache-line status array 40 is used to determine available cache-lines during the pre-allocation routine. For example, after a cache miss occurs, the cache-line status array 40 is checked to determine a cache-line address of the render cache 24 that is available to allocate new pixel data. The entries in the cache-line status array 40 indicate which cache-line addresses are currently in use, and therefore unavailable to the allocation routine. An available cache-line address may be selected based on one of many well-known cache-aging algorithms, such as the least recently used algorithm. The cache-line that is selected must be scheduled for eviction. For example, the pixel data that is stored at the selected cache-line address must be written to main memory 14, or a graphics memory (not shown) before new pixel data is written to the cache-line address.

For one embodiment of the present invention, the size of the render-cache 22 and associated CAM 44 can be selected based on the maximum number of sub-spans being processed at any given time within the graphics engine 20. The maximum number of sub-spans being processed by the graphics engine 20 at any given time can be used as an upper bound to size the render-cache 24 and the associated CAM 44. For example, if the raster logic 30 generates sub-spans that are 2 pixels by 2 pixels, four entries are required in the render-cache 24 and the CAM 44 for every active thread in the engine.

Figure 4:
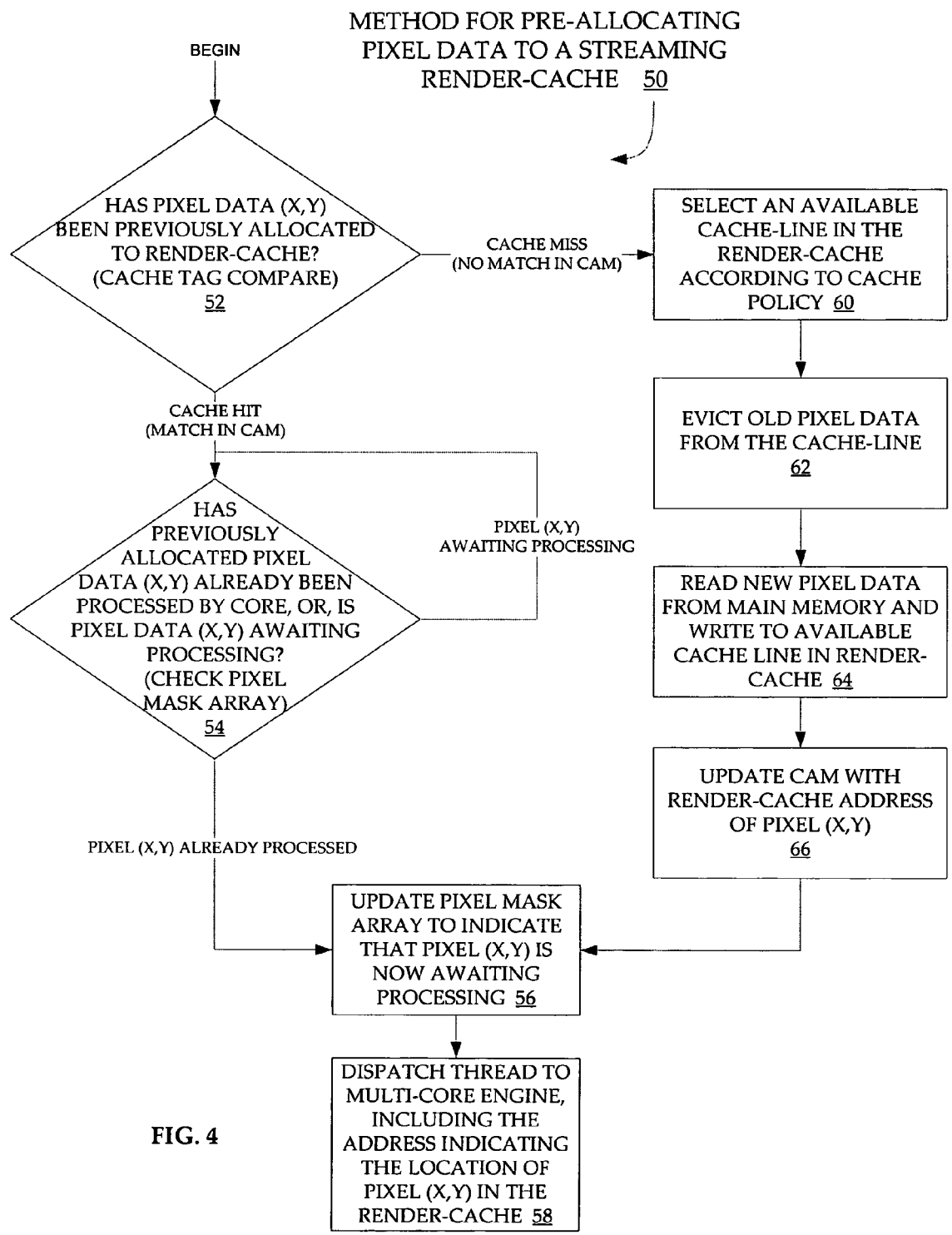
FIG. 4 is a flow diagram illustrating a method for pre-allocating pixel data to a streaming render-cache for processing by a multithreading, multi-core graphics engine.

FIG. 4 is a flow diagram illustrating a method 50 for pre-allocating pixel data to a streaming render-cache for processing by a multithreading, multi-core graphics engine. At operation 52, the method begins with a cache tag comparison. For each pixel being processed, based on the pixel's X and Y coordinates, a look-up operation is performed to determine whether the particular pixel has been previously allocated to the render-cache.

If the cache-tag comparison results in a cache miss, then at operation 60, an available cache-line address is selected according to a cache-scheduling or cache-aging policy. At operation 62, the pixel data stored in the selected cache-line is evicted, or written to main memory 14. At operation 64, new pixel data is read from main memory and written to the selected, available cache-line address of the render-cache. Next, at operation 64, the CAM is updated with the render-cache address where the particular pixel is stored. In addition, at operation 56, the pixel mask array is updated to indicate that pixel data associated with the particular pixel is now waiting to be processed. Finally, at operation 58, a thread is dispatched to the multi-core engine. The thread includes the cache-line address indicating the location in the render-cache where the graphics engine can access the pixel data associated with the particular pixel.

If, however, the cache-tag comparison results in a hit, then at operation 54, the pixel mask array is checked to determine whether the previously allocated pixel data is in flight. For example the pixel mask array is checked to determine whether the graphics engine has already processed the previously allocated pixel data, or whether the pixel data is waiting to be processed. If the previously allocated pixel data is still waiting to be processed, then the render-cache controller 22 blocks the thread from being dispatched. Only after the pixel mask array indicates that previously allocated pixel has been retired from the core is the thread dispatcher allowed to dispatch a thread including the cache-line address of the particular pixel. For example, if at operation 54, the pixel mask array indicates that the previously allocated pixel data has already been processed, then at operation 56, the pixel mask array is updated to indicate that the pixel data is now waiting to be processed. Accordingly, at operation 58, a thread is dispatched to the graphics engine including the render-cache address where the pixel data is located.

The embodiments of the invention described above provide several advantages over prior art multithreading, multi-core graphics processors. One advantage is that the need for having two separate CAMs is eliminated. For example, there is no need to have one CAM, at the thread dispatch point, to control the order in which threads are dispatched, and a second CAM, at the multi-core engine, to maintain the data coherency of the render-cache. A second advantage of the render-cache controller described herein is that it provides control for a fully associative render-cache that requires only one lookup operation, while maintaining data coherency by allowing only one cache-line in-flight. In addition, the render-cache controller is advantageous because it can be sized based on the working set of the multi-core engine and it hides the latency of the main memory by pre-allocating pixel data to the render-cache, thereby taking advantage of the core's thread-switching and compute cycles. Finally, the render-cache controller takes advantage of the spatial locality of pixel data in main memory. For example, because the render-cache controller maintains the order in which threads are dispatched, cache hits are likely to occur. If, however, a cache miss does occur, the main memory access should not require a page swap, because the required pixel data will likely be found within the page that is in main memory.

Thus, a method and apparatus for rendering graphics using a render-cache with a multi-threaded, multi-core graphics processor is provided with reference to specific exemplary embodiments. It will be evident that various modifications and changes may be made to theses embodiments without departing from the broader spirit and scope of the invention. Accordingly, the specification and drawings are to be regarded in an illustrative rather than a restrictive sense.

We claim:

1. A graphics processor, comprising:
    a multithreading, multi-core graphics engine to process pixel data;
    a render-cache, readily accessible to the graphics engine, to store the pixel data; and,
    a render-cache controller to maintain the order in which each thread is dispatched to the graphics engine in line with the multithreading, multi-core graphics engine processing the pixel data corresponding to each thread, and to maintain data coherency between the render-cache and a main memory, wherein the render-cache controller is to block a thread from dispatching to the graphics engine if the thread specifies a cache-line address of the render-cache containing a pixel in flight, and wherein a single look-up of the render-cache controller acquires information to control the thread being dispatched to or blocked from the graphics engine based on the data coherency maintained by the render-cache controller and the order of the thread maintained by the render-cache controller.

2. The graphics processor of claim 1, further including:
    raster logic to generate threads, each thread including at least one cache-line address indicating the location of the pixel data in the render-cache; and,
    a thread dispatcher to dispatch each thread to the graphics engine only when the render-cache controller indicates that the at least one cache-line address is valid.

3. The graphics processor of claim 2, wherein the multithreading, multi-core graphics engine is to process pixel data for rendering 3D graphics.

4. The graphics processor of claim 2, wherein the at least one cache-line address is valid if the render-cache controller indicates a cache hit during a look-up operation, and the pixel data stored at the at least one cache-line address is not in-flight.

5. The graphics processor of claim 2, wherein the render-cache controller comprises:
    a content addressable memory to map pixel coordinates to a cache-line address of the render-cache, the address specifying a location in the render-cache where pixel data corresponding to the pixel coordinates is stored;
    a pixel mask array having a mask bit for every entry of the content addressable memory, each mask bit to indicate whether previously allocated pixel data is in flight; and,
    a cache-line status array with a status bit for every entry of the content addressable memory, each status bit to indicate the availability of a cache-line in the render-cache.

6. The graphics processor of claim 5, wherein the render-cache controller further comprises a pipeline interface to receive cache-line addresses when the graphics engine reads from or writes to the render-cache.

7. The graphics processor of claim 6, wherein the render-cache controller maintains the in-flight status of pixel data stored in the render-cache by receiving the cache-line addresses from the pipeline interface.

8. The graphics processor of claim 7, wherein the render-cache controller changes the status of pixel data stored at a particular cache-line address to indicate that the pixel data is in-flight when the render-cache controller receives the address of the cache-line via the pipeline when the graphics engine reads the pixel data from the cache-line associated with the cache-line address.

9. The graphics processor of claim 7, wherein the render-cache controller changes the status of pixel data stored at a particular cache-line address to indicate that the pixel data is no longer in flight when the render-cache controller receives the address of the cache-line via the pipeline when the graphics engine writes the pixel data to the cache-line associated with the cache-line address.

10. A render-cache controller comprising:
    a content addressable memory to map pixel coordinates to a cache-line address of a render-cache, the cache-line address specifying a location in the render-cache where pixel data corresponding to the pixel coordinates is stored, wherein the render-cache controller is to block a thread dispatcher from dispatching threads generated by raster logic if threads include cache-line addresses of the render-cache containing pixel data in flight;
    a pixel mask array having a mask bit for every entry of the content addressable memory, each mask bit to indicate whether previously allocated pixel data is in flight; and,
    a cache-line status array with a status bit for every entry of the content addressable memory, each status bit to indicate the availability of a cache-line in the render-cache, wherein a single look-up of the render-cache controller acquires information to control a thread being dispatched to or blocked from a multi-threading, multi-core graphics engine based on the content addressable memory, the pixel mask array, the cache-line status array, and an order of the threads in line with the multi-threading, multi-core graphics engine processing the pixel data corresponding to each thread maintained by the render-cache controller.

11. The render-cache controller of claim 10, further comprising:
    a pipeline interface to receive a cache-line address when the graphics engine reads or writes the pixel data to the render-cache.

12. The render-cache controller of claim 11, wherein the pixel mask array is to set the mask bit corresponding with a cache-line address of the render-cache when the pixel data stored at the cache-line address is read by the graphics engine and the cache-line address is received by the render-cache controller via the pipeline interface, the set mask bit indicating that the pixel data read from the cache-line address is in flight.

13. The render-cache controller of claim 11, wherein the pixel mask array is to reset the mask bit corresponding with a cache-line address of the render-cache when pixel data is written by the graphics engine to the cache-line address and the cache-line address is received by the render-cache controller via the pipeline interface, the reset mask bit indicating that the pixel data written to the cache-line address is not in flight.

14. The render-cache controller of claim 11, wherein the pixel mask array indicates whether cache-line addresses included in the threads are associated with the pixel data in flight.

15. The render-cache controller of claim 11, wherein the pixel data is in flight if it has been read by the graphics engine more recently than it has been written to the render-cache.

16. A method to pre-allocate pixel data to a render-cache, the method comprising:
   checking a content addressable memory to determine whether pixel data for a particular pixel has been previously allocated to the render-cache;
   if the pixel data for the particular pixel has not been previously allocated to the render-cache then
      checking a cache-line status array to determine an address of an available cache-line in the render-cache,
      evicting pixel data from the address of the available cache-line, writing the pixel data to the address of the available cache-line in the render-cache, and
      setting a bit in a pixel mask array to indicate that the pixel data written to the address of the available cache-line is in flight, the pixel mask array having a plurality of bits, one bit for every entry of the content addressable memory, each bit to indicate whether previously allocated pixel data is in flight; and
   if the pixel data for the particular pixel has been previously allocated to the render-cache then
      checking the pixel mask array to determine whether the previously allocated pixel data is in flight,
      blocking a thread corresponding to the previously allocated pixel data from dispatching to a graphics engine if the previously allocated pixel data is in flight, and
      dispatching a thread to the graphics engine if the previously allocated pixel data is not in-flight,
         wherein a single look-up of a render-cache controller acquires information to control a thread being dispatched to or blocked from the graphics engine based on the content addressable memory, the pixel mask array, the cache-line status array, and an order of the threads in line with the graphics engine processing the pixel data corresponding to each thread maintained by the render-cache controller.

17. The method of claim 16, wherein checking the content addressable memory to determine whether the pixel data for a particular pixel has been previously allocated to the render-cache includes comparing the X and Y coordinates of the particular pixel to X and Y coordinates of pixel data stored in the content addressable memory and determining that the pixel data has been previously allocated if the comparison results in a match.

18. The method of claim 16, wherein checking a cache-line status array to determine an address of an available cache-line in the render-cache includes selecting an available cache-line based on a cache-line selection algorithm.

19. The method of claim 18, wherein the cache-line selection algorithm is based on a least recently used selection algorithm.

20. The method of claim 16, wherein evicting the pixel data from the address of the available cache-line includes writing the pixel data to a memory.

21. A portable media device comprising:
   a CPU;
   a main memory;
   a graphics processor, the graphics processor comprising a multithreading, multi-core graphics engine to generate graphics by processing pixel data, a render-cache to store the pixel data, and a render-cache controller to maintain the order in which each thread is dispatched to the graphics engine in line with the multithreading, multi-core graphics engine processing the pixel data corresponding to each thread and to maintain data coherency between the render-cache and the main memory, the render-cache controller having a pixel mask array to identify in flight pixel data, the render-cache controller having a cache-line status array to identify availability of a cache-line in the render-cache, wherein the graphics processor further comprises raster logic to generate threads, each thread including at least one cache-line address indicating the location of the pixel data in the render-cache, and a thread dispatcher to dispatch each thread to the graphics engine only when the render-cache controller indicates a cache hit during a lookup operation, and the pixel data stored at the at least one cache-line address is not in-flight, wherein a single look-up of the render-cache controller acquires information to control a thread being dispatched to or blocked from the graphics engine based on a content addressable memory, the pixel mask array, the cache-line status array, and an order of the threads in line with the multithreading, multi-core graphics engine processing the pixel data corresponding to each thread maintained by the render-cache controller; and
   a battery to provide power to the CPU, the main memory, and the graphics processor.

22. The portable media player of claim 21, further comprising:
   a liquid crystal display to display the graphics generated by the graphics processor.

23. The portable media player of claim 21, wherein the graphics engine is to generate 3D graphics.

* * * * *